(12) United States Patent
Eaton et al.

(10) Patent No.: US 12,168,996 B2
(45) Date of Patent: Dec. 17, 2024

(54) BEARING ASSEMBLY FOR A BLENDER JAR

(71) Applicant: WHIRLPOOL CORPORATION, Benton Harbor, MI (US)

(72) Inventors: Christopher J. Eaton, Stevensville, MI (US); Timothy E. Heater, Hartford, MI (US); Paul S. Paget, Kalamazoo, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 1075 days.

(21) Appl. No.: 16/877,589

(22) Filed: May 19, 2020

(65) Prior Publication Data
US 2021/0364035 A1 Nov. 25, 2021

(51) Int. Cl.
| | | |
|---|---|---|
| *F16C 19/16* | (2006.01) | |
| *A47J 43/046* | (2006.01) | |
| *B01F 7/16* | (2006.01) | |
| *B01F 15/00* | (2006.01) | |
| *B01F 27/808* | (2022.01) | |
| *B01F 35/32* | (2022.01) | |
| *B01F 35/30* | (2022.01) | |
| *B01F 101/00* | (2022.01) | |

(52) U.S. Cl.
CPC ............ *F16C 19/16* (2013.01); *A47J 43/046* (2013.01); *B01F 27/808* (2022.01); *B01F 35/323* (2022.01); *B01F 2035/351* (2022.01); *B01F 2035/352* (2022.01); *B01F 2101/1805* (2022.01); *F16C 2320/00* (2013.01)

(58) Field of Classification Search
CPC ...... A47J 43/046; A47J 43/0716; F16C 19/16
See application file for complete search history.

(56) References Cited

U.S. PATENT DOCUMENTS

| | | |
|---|---|---|
| 5,297,475 A | 3/1994 | Borger et al. |
| 6,960,015 B2 | 11/2005 | Lee |
| 9,283,528 B2 | 3/2016 | Thai |
| 9,750,372 B2 | 9/2017 | Foxlee et al. |
| 10,493,412 B2 | 12/2019 | Dickson, Jr. et al. |

(Continued)

FOREIGN PATENT DOCUMENTS

| | | |
|---|---|---|
| FR | 2967340 A1 | 5/2012 |
| WO | 2013120145 A1 | 8/2013 |

OTHER PUBLICATIONS

European Extended Search Report for Application No. 21173441.3, dated Oct. 8, 2021.

*Primary Examiner* — Elizabeth Insler
(74) *Attorney, Agent, or Firm* — Price Heneveld LLP

(57) ABSTRACT

A bearing assembly for a blender jar assembly includes a blender jar having a bottom wall that defines an opening. A retainer is positioned within the blender jar and defines a receiving space in communication with the opening. A jar collar is positioned exterior of the blender jar and is operably coupled with the retainer. A bearing housing is positioned within the receiving space and is spaced apart from the retainer by a first spacing. A nut is operably coupled with the bearing housing and is at least partially received by the receiving space. The nut is spaced apart from the retainer by a second spacing. A gasket is positioned to maintain at least one of the first and second spacings of the bearing housing and the nut relative to the retainer.

17 Claims, 5 Drawing Sheets

(56) References Cited

U.S. PATENT DOCUMENTS

| | | | |
|---|---|---|---|
| 2013/0264403 A1 | 10/2013 | Thai | |
| 2015/0023130 A1* | 1/2015 | Foxlee | A47J 43/085 |
| | | | 366/205 |
| 2016/0331181 A1* | 11/2016 | Dickson, Jr. | A47J 43/0722 |
| 2018/0008097 A1* | 1/2018 | Mehlman | A47J 43/046 |
| 2018/0168402 A1 | 6/2018 | Arnett et al. | |

* cited by examiner

BEARING ASSEMBLY FOR A BLENDER JAR

FIELD OF DISCLOSURE

The present disclosure generally relates to a bearing assembly, and more specifically, to bearing assembly for a blender jar.

BACKGROUND

Bearing assemblies for blender jars may include, or be coupled with, various components, such as bearing housings and blade assemblies. Contact between these components may produce noise when operating the blender jar assembly.

SUMMARY OF THE DISCLOSURE

According to one aspect of the present disclosure, bearing assembly for a blender jar assembly may include a blender jar having a bottom wall that may define an opening. A retainer may be positioned within the blender jar and may define a receiving space in communication with the opening. A jar collar may be positioned exterior of the blender jar and may be operably coupled with the retainer. A bearing housing may be positioned within the receiving space and may be spaced apart from the retainer by a first spacing. A nut may be operably coupled with the bearing housing and may be at least partially received by the receiving space. The nut may be spaced apart from the retainer by a second spacing. A gasket may be positioned to maintain at least one of the first and second spacings of the bearing housing and the nut relative to the retainer.

According to yet another aspect of the present disclosure, a bearing assembly for a blender jar assembly may include a blender jar defining an interior cavity and a bottom opening. A retainer may be positioned within the interior cavity and may at least partially extend through the bottom opening. The retainer may define a receiving space in communication with an upper aperture and a lower aperture. A bearing housing may be positioned within the receiving space. The bearing housing extends at least partially into the upper aperture of the retainer. The bearing housing may be spaced apart from an inner wall of the retainer to define a first spacing therebetween. A nut may be positioned within the lower aperture of the retainer and may be operably coupled with the bearing housing. The nut may be spaced apart from the inner wall of the retainer to define a second spacing therebetween. A first gasket may be positioned to maintain the first spacing of the bearing housing relative to the retainer. A second gasket may be positioned to maintain the second spacing of the nut relative to the retainer and the bearing housing.

According to yet another aspect of the present disclosure, a bearing assembly for a blender jar assembly may include a blender jar having a bottom wall and a bottom opening extending therethrough. A retainer may be positioned to contact the bottom wall and may include an inner wall defining a receiving space. The retainer may include an upper edge that defines an upper aperture and a lower edge that defines a lower aperture. Each of the upper and lower apertures may be in communication with the receiving space. A bearing housing may be positioned within the receiving space. The bearing housing may be at least partially received by the upper aperture of the retainer. The bearing housing may be spaced apart from the upper edge and the inner wall of the retainer. A nut may be positioned within the lower aperture of the retainer and may contact the bearing housing. The nut may be spaced apart from the inner wall of the retainer. A first gasket may be positioned between the bearing housing and the retainer. A second gasket may be positioned between the nut, the retainer, and the bearing housing.

These and other features, advantages, and objects of the present disclosure will be further understood and appreciated by those skilled in the art by reference to the following specification, claims, and appended drawings.

Figure 1:
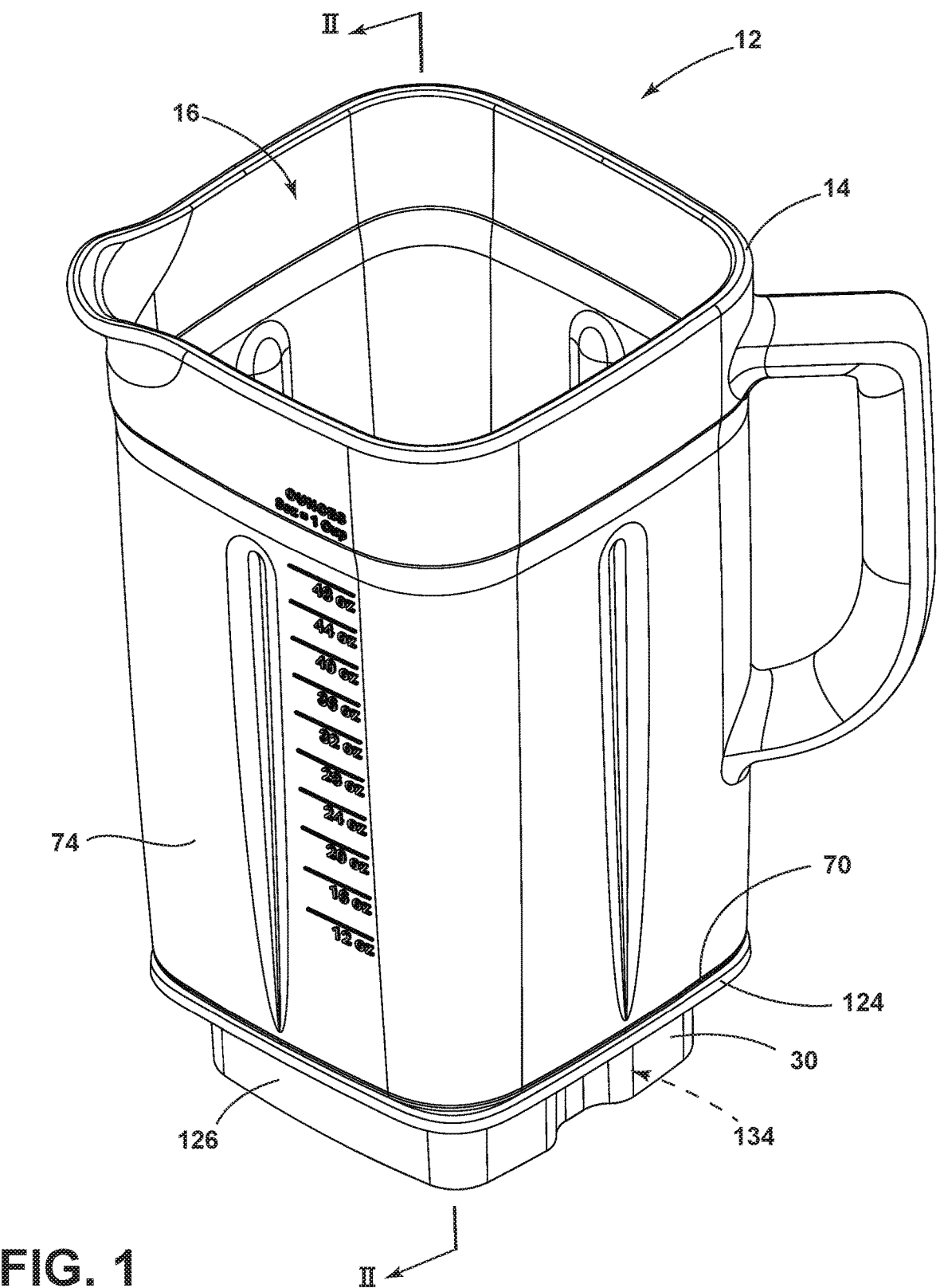
FIG. 1 is a side perspective view of a blender jar assembly including a blender jar and a jar collar.

The components in the figures are not necessarily to scale, emphasis instead being placed upon illustrating the principles described herein.

DETAILED DESCRIPTION

The present illustrated embodiments reside primarily in combinations of method steps and apparatus components related to a bearing assembly for a blender jar. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-5, reference numeral 10 generally designates a bearing assembly of a blender jar assembly 12. A blender jar 14 defines an interior cavity 16 and a bottom opening 18. A retainer 20 is positioned within the interior cavity 16 and at least partially extends through the bottom opening 18 of the blender jar 14. The retainer 20 includes an inner wall 22 that defines a receiving space 24. The retainer 20 further defines an upper aperture 26 and a lower aperture 28. Each of the upper and lower apertures 26, 28 is in communication with the receiving space 24. A jar collar 30 is operably coupled with the retainer 20 and is positioned exterior of the blender jar 14. A bearing housing 32 is positioned within the receiving space 24. The bearing housing 32 extends at least partially into the upper aperture 26 of the retainer 20. The bearing housing 32 is spaced apart from an upper edge 34 of the retainer 20 that defines the upper aperture 26 and is also spaced apart from the inner wall 22 of the retainer 20. A nut 36 is positioned within the lower aperture 28 of the retainer 20 and is operably coupled with the bearing housing 32. The nut 36 is spaced apart from the inner wall 22 of the retainer 20. A first gasket 38 is positioned to maintain a first spacing 42 between the bearing housing 32 and the retainer 20. A second gasket 40 is positioned to maintain a second spacing 44 between the nut 36, the retainer 20, and the bearing housing 32.

Figure 2:
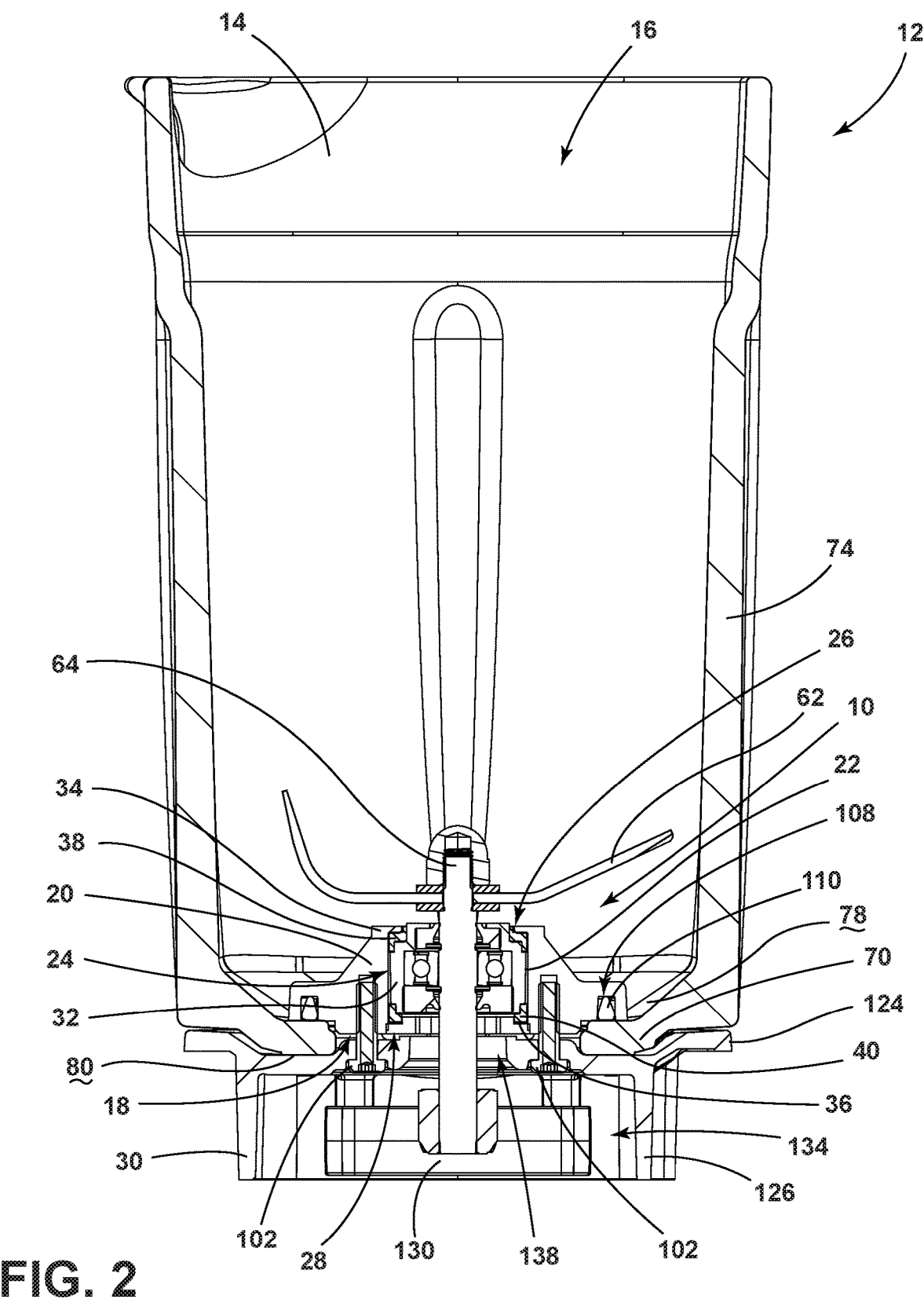
FIG. 2 is a cross-sectional view of the blender jar assembly of FIG. 1 taken along line II-II and showing a bearing assembly of the blender jar.

Referring now to FIGS. 1 and 2, the blender jar assembly 12 includes the blender jar 14 defining the interior cavity 16 and coupled with the jar collar 30. The blender jar 14 may be formed of glass or may be formed of any other suitable material. The blender jar 14 is coupled with the jar collar 30 such that the blender jar assembly 12 is configured to be removably and operably coupled with a blender base (not shown). The blender base may be any blender base including an actuator for a plurality of blade 62 positioned within the interior cavity 16 of the blender jar assembly 12. For example, the blender base may include a motor and coupling assembly or any other actuator.

Referring still to FIGS. 1 and 2, the blender jar 14 includes a bottom wall 70 extending radially inward from an outer wall 74 of the blender jar 14. The outer wall 74 at least partially defines the interior cavity 16 of the blender jar 14 configured to receive goods for blending. The bottom wall 70 includes an interior surface 78 positioned within the interior cavity 16 of the blender jar 14 and an exterior surface 80 positioned exterior of the interior cavity 16 of the blender jar 14. The bottom wall 70 of the blender jar 14 defines the bottom opening 18 of the bottom wall 70 of the blender jar 14. In various examples, as illustrated, the bottom wall 70 may substantially linear. However, it is contemplated that the bottom wall 70 may be non-linear without departing from the scope of the present disclosure.

The plurality of blades 62 are positioned within the blender jar 14 and are operably coupled with a blade shaft 64. The blade shaft 64 extends from the plurality of blades 62 and through the bottom opening 18 of the blender jar 14. The blade shaft 64 further extends exterior of the blender jar 14 and into and/or through the jar collar 30. The blade shaft 64 is configured to extend through the bearing assembly 10, as discussed in more detail elsewhere herein.

As best illustrated in FIG. 2, the bearing housing assembly 10 is configured to be positioned at least partially within the blender jar 14 and coupled with the bottom wall 70 of the blender jar 14. As previously introduced, the bearing housing assembly 10 includes the retainer 20 coupled with the jar collar 30, and the bearing housing 32 and nut 36 positioned within the receiving space 24 of the retainer 20.

Figure 3:
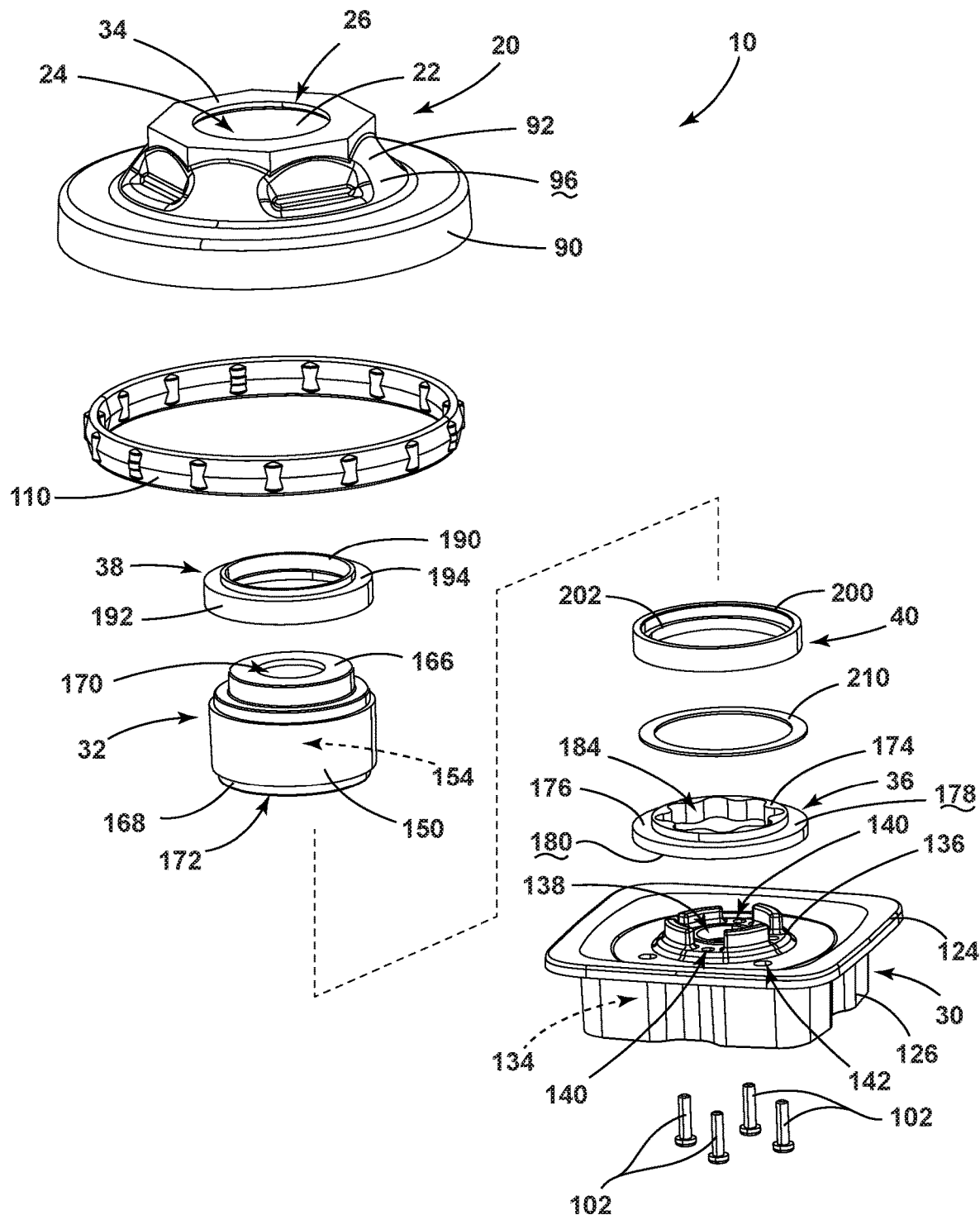
FIG. 3 is an exploded view of the bearing assembly of FIG. 2.
Figure 4:
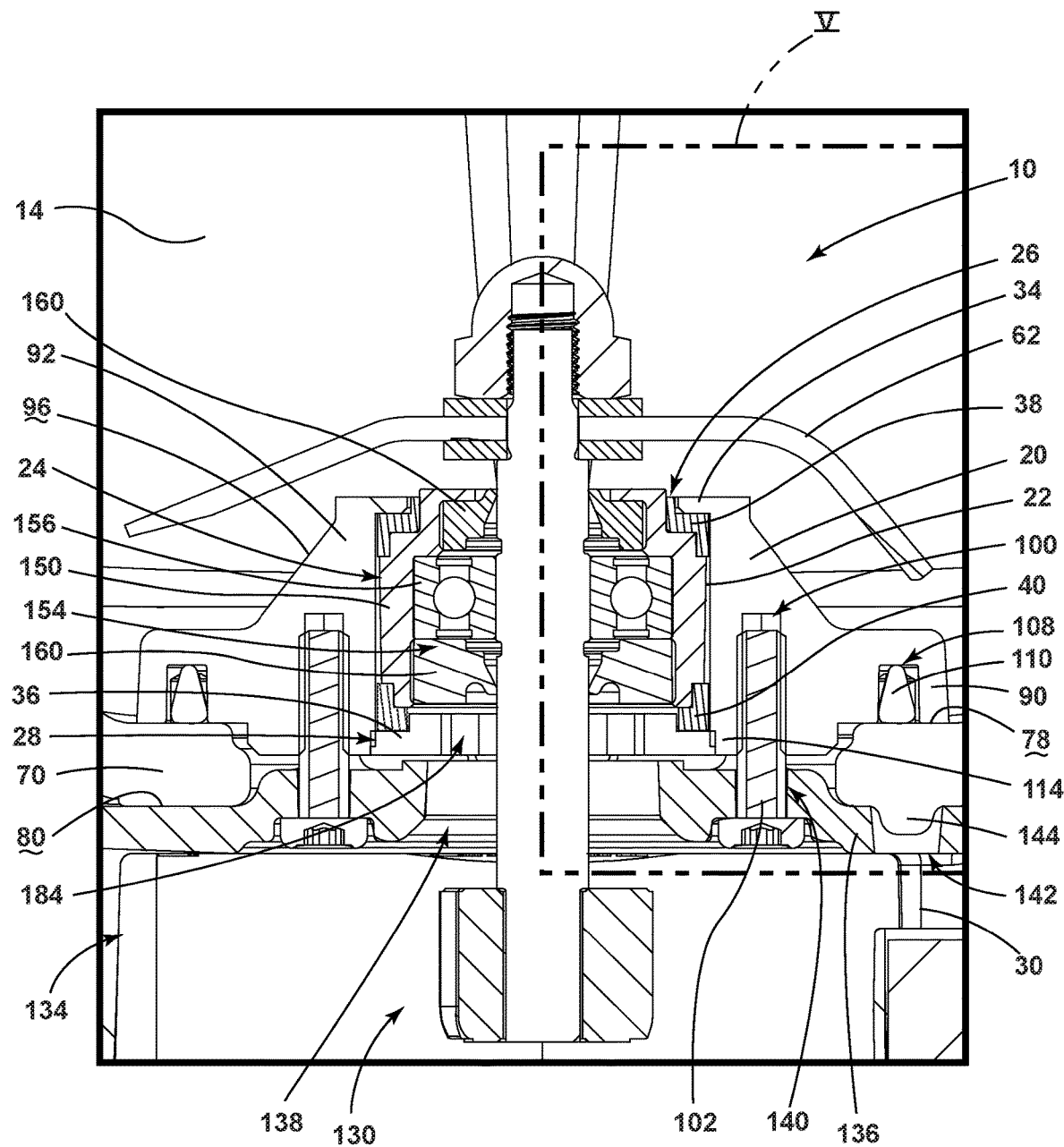
FIG. 4 is an enlarged view of the bearing assembly of FIG. 2.
Figure 5:
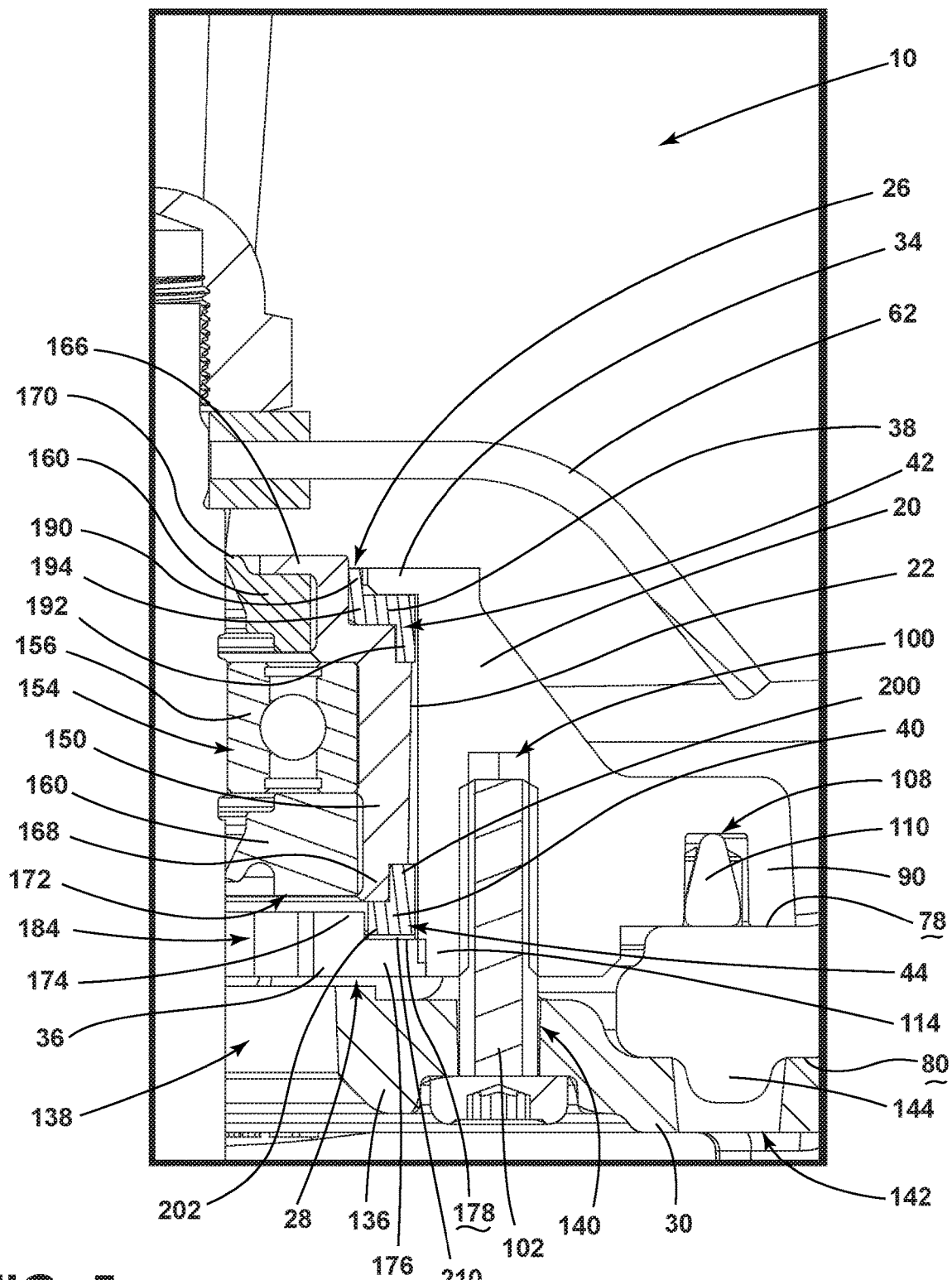
FIG. 5 is an enlarged view of section V of FIG. 4.

Referring now to FIGS. 3-5, the various components of the bearing housing assembly 10 are illustrated individually (FIG. 3) and assembled (FIGS. 4 and 5). As best illustrated in FIGS. 3 and 4, the retainer 20 includes the upper edge 34 defining the upper aperture 26 in communication with the receiving space 24. The upper aperture 26 may have a diameter that is less than a diameter of the receiving space 24 such that the upper edge 34 acts as a stop to prevent the bearing housing 32 from sliding through the upper aperture 26 when the bearing housing 32 is positioned within the receiving space 24.

The retainer 20 further includes an outer rim 90 extending radially outward from a body portion 92 of the retainer 20. The body portion 92 may be generally frustoconical and may include the inner wall 22 defining the receiving space 24 and an outer surface 96. The outer surface 96 is exposed within the interior cavity 16 of the blender jar 14 and may be generally inclined upward from the outer rim 90 to the upper edge 34 of the retainer 20. The outer surface 96 may be a smooth surface or may include divots, ridges, or other textured features.

As best shown in FIGS. 4 and 5, the body portion 92 of the retainer 20 further defines at least one coupling well 100 opening downward toward the bottom wall 70 of the blender jar 14 when the retainer 20 is positioned within the interior cavity 16. The body portion 92 of the retainer 20 extends at least partially into the bottom opening 18 of the blender jar 14 such that the lower aperture 28 of the retainer and the at least one coupling well 100 are each in communication with the bottom opening 18. The at least one coupling well 100 is configured to receive a fastener 102 to couple the jar collar 30 with the retainer 20, as discussed in more detail elsewhere herein.

The outer rim 90 of the retainer 20 further defines a sealing channel 108 extending circumferentially about the retainer 20. When the retainer 20 is positioned within the blender jar 14, the outer rim 90 contacts the interior surface 78 of the bottom wall 70 such that the sealing channel 108 is further enclosed by the interior surface 78. A sealing ring 110 is positioned within the sealing channel 108 and at least partially contacts the interior surface 78 of the bottom wall 70. The sealing ring 110 is configured to act as a seal between the blender jar 14 and the retainer 20 to prevent contents of the blender jar 14 from seeping between the retainer 20 and the bottom wall 70 and through the bottom opening 18 of the blender jar 14. It will be understood that the sealing ring 110 may be any gasket configured to act as a seal between the retainer 20 and the bottom wall 70 without departing from the scope of the present disclosure.

The body portion 92 of the retainer 20 further includes a lower edge 114 positioned interior of the outer rim 90 of the retainer 20. The lower edge 114 defines the lower aperture 28 in communication with the bottom opening 18 of the bottom wall 70 of the blender jar 14 and in communication with the receiving space 24 of the retainer 20. It is contemplated that the lower aperture 28 may have a diameter that is greater than the diameter of the receiving space 24, or the lower aperture 28 may have a diameter that is the same as the diameter of the receiving space 24.

Referring again to FIGS. 2 and 3, the jar collar 30 includes an outer edge 124 extending outward from a body 126 of the jar collar 30. The outer edge 124 is configured to be in contact with the exterior surface 80 of the bottom wall 70 when the jar collar 30 is coupled with the retainer 20 by the fastener 102. It will be understood that the outer edge 124 may be substantially similar in shape to the cross-sectional shape of the body 126 or may have a different shape (e.g., the body 126 of the jar collar 30 may be substantially cylindrical while the outer edge 124 has a substantially rectangular or square shape).

The body 126 of the jar collar 30 defines a cavity 134 configured to house a coupling assembly 130. An inner edge 136 of the jar collar 30 is positioned interior of the outer edge 124 and defines a collar opening 138 in communication with the cavity 134. When the jar collar 30 is coupled with the retainer 20, the collar opening 138 is further in communication with the bottom opening 18 of the blender jar 14 and the lower aperture 28 of the retainer 20. In various examples, the inner edge 136 may extend at least partially into the bottom opening 18 of the blender jar 14 to couple with the retainer 20.

Referring again to FIGS. 3-5, the inner edge 136 of the jar collar 30 further defines at least one through-hole 140 aligned with the at least one coupling well 100 of the retainer 20 when the jar collar 30 contacts the bottom wall 70 of the blender jar 14. The fastener 102 extends through the through-hole 140 and into the coupling well 100 to couple the jar collar 30 with the retainer 20. The coupling of the jar collar 30 with the retainer 20 retains the bottom wall 70 of the blender jar 14 between the retainer and the jar collar 30. The positioning of the inner edge 136 of the jar collar 30 within the bottom opening 18 of the blender jar 14 when the jar collar 30 is coupled with the retainer 20 further encloses the bearing housing 32 and nut 36 within the receiving space 24 of the retainer 20, as discussed in more detail elsewhere herein.

As best illustrated in FIG. 2, the cavity 134 of the jar collar 30 is configured to house a coupling assembly 130 coupled with the plurality of blades 62 by the blade shaft 64. The coupling assembly 130 is positioned within the cavity 134 and is coupled with an end of the blade shaft 64 extending through the collar opening 138 and into the jar collar 30.

Referring again to FIGS. 4 and 5, the jar collar 30 may further define a guide aperture 142 between the inner edge 136 and the outer edge 124 of the jar collar 30. The guide aperture 142 may be configured as a divot or may extend through the jar collar 30 to be in communication with the cavity 134. The exterior surface 80 of the bottom wall 70 may include a guide 144 extending downward and configured to be received by the guide aperture 142 to guide the positioning of the blender jar 14 and the jar collar 30 before coupling the jar collar 30 with the retainer 20. It is contemplated that the guide aperture 142 may be one of a plurality of guide apertures and the guide 144 may be one of a plurality of corresponding guides to be received by the plurality of guide apertures without departing from the scope of the present disclosure.

Referring again to FIGS. 3-5, the bearing housing 32 includes a housing body 150 defining a bearing space 154. As best illustrated in FIGS. 4 and 5, the housing body 150 may be generally cylindrical and is configured to fit within the receiving space 24 defined by the inner wall 22 of the retainer 20. The housing body 150 may be sized such that the housing body 150 is spaced apart from the inner wall 22 of the retainer 20 or may be sized such that the housing body 150 is in contact with the inner wall 22 of the retainer 20.

Referring now to FIGS. 4 and 5, the bearing space 154 may also be generally cylindrical and is configured to house one or more bearings 156. For example, the receiving space 24 may be sized to house a single bearing, two bearings, or more than two bearings. As illustrated, the bearings 156 may be configured as ball bearings to facilitate rotation of the plurality of blades 62 by the shaft 64. However, it is contemplated that the bearings 156 may be any type of bearing without departing from the scope of the present disclosure.

A plurality of seal members 160 may be positioned within the bearing space 154 proximate the bearings 156 and may be configured to seal the shaft 64 to prevent contents of the blender jar 14 from entering the bearing space 154. The bearing housing assembly 10 may include any number of seal members 160 without departing from the scope of the present disclosure. It will also be understood that the seal members 160 may be formed of any material configured to provide a seal around the shaft 64 to prevent contents of the blender jar 14 from entering the bearing space 154.

Referring now to FIGS. 3 and 5, the bearing housing 32 includes an upper rim 166 extending upward from the body portion 92 of the bearing housing 32. The upper rim 166 defines an upper opening 170 in communication with the bearing space 154 of the bearing housing 32. The upper opening 170 is configured to receive the blade shaft 64 and may be configured to at least partially receive on the seal members 160 to prevent leaks around the blade shaft 64.

The upper rim 166 is configured to be received by the upper aperture 26 of the retainer 20. The upper rim 166 has a diameter that is smaller than a diameter of the body portion 92. The difference in the diameters allows the body portion 92 to be positioned below the upper edge 34 of the retainer 20 when the upper rim 166 is received by the upper aperture 26 of the retainer 20. The upper rim 166 of the bearing housing 32 may be positioned substantially flush with the upper edge 34. Alternatively, the upper rim 166 may be raised past the upper edge 34 of the retainer 20.

The bearing housing 32 may further include a lower rim 168 positioned opposite the upper rim 166 and extending downward from the body portion 92. The lower rim 168 defines a lower opening 172 in communication with the lower aperture 28 of the retainer 20. In various examples, the lower rim 168 may be substantially aligned with the lower edge 114 of the retainer 20. In other examples, the bearing housing 32 may be positioned such that the lower rim 168 is recessed into the receiving space 24 of the retainer 20.

Referring still to FIGS. 3-5, the nut 36 is positioned within the lower aperture 28 of the retainer 20 and at least partially contacts the lower rim 168 of the bearing housing 32. In various examples, the bearing housing 32 may be coupled with the nut 36. In other examples, the coupling of the jar collar 30 with the retainer 20 may be configured to retain the nut 36 in contact with the bearing housing 32.

The nut 36 is generally circular and includes an inner portion 174 and an outer portion 176. The inner portion 174 extends upward from the outer portion 176 and may have a smaller diameter than the outer portion 176. When the nut 36 is received by the lower aperture 28 of the retainer 20, the inner portion 174 is configured to contact the lower rim 168 of the bearing housing 32, and the outer portion 176 is sized to fit within and fill the lower aperture 28.

The outer portion 176 includes a rim surface 178 spaced apart from the bearing housing 32. A bottom surface 180 of the nut 36 contacts the inner edge 136 of the jar collar 30 when the jar collar 30 is coupled with the retainer 20. The rim surface 178 and the bottom surface 180 may be positioned on opposing sides of the outer portion 176 of the nut 36.

The inner portion 174 defines a nut aperture 184 aligned with the collar opening 138 to receive the blade shaft 64. As illustrated, the nut aperture 184 may be defined with a cross-sectional shape with circumferentially repeating curves (e.g., a shape that is substantially similar to a rose graph or flower). However, it is contemplated that the nut aperture 184 may be any rotatable shape, including, for example, a circle or an oval, without departing from the scope of the present disclosure.

As best shown in FIG. 5, the bearing housing assembly 10 includes the first and second gaskets 38, 40 configured to maintain the first spacing 42 defined between the bearing housing 32 and the second spacing 44 defined between the nut 36 relative to the retainer 20. The first gasket 38 is positioned proximate the upper aperture 26 of the retainer 20, and the second gasket 40 is positioned proximate the lower aperture 28 of the retainer 20.

The first gasket 38 is positioned between the bearing housing 32 and the inner wall 22 of the retainer 20 and is configured to maintain the first spacing 42 defined between the bearing housing 32 and the retainer 20. The first gasket 38 includes first and second legs 190, 192 extending from opposing ends of a central portion 194 and oriented such that the first and second legs 190, 192 are substantially parallel. In other words, the first gasket 38 may have a substantially step-shaped cross-section. The central portion 194 is positioned between the upper edge 34 of the retainer 20 and the body portion 92 of the bearing housing 32. The first leg 190 extends upward from the central portion 194 and is positioned between the upper rim 166 of the bearing housing 32 and the upper edge 34 of the retainer 20. The second leg 192 extends downward from the central portion 194 and is positioned between the inner wall 22 of the retainer 20 and the bearing housing 32. In some examples, the first gasket 38 may include only the central portion 194 and one of the first leg 190 and the second leg 192. In other words, in some examples, the first gasket 38 may be substantially L-shaped.

Referring still to FIG. 5, the second gasket 40 is positioned between the rim surface 178 of the nut 36, the lower rim 168 of the bearing housing 32, and the inner wall 22 of the retainer 20. The second gasket 40 includes a first leg 200 positioned between the inner wall 22 of the retainer 20 and the lower edge 114 of the bearing housing 32. A second leg 202 of the second gasket 40 extends from, and is substantially perpendicular to, the first leg 200. The second leg 202 is positioned between the rim surface 178 of the outer portion 176 of the nut 36 and the lower edge 114 of the bearing housing 32. In other words, the second gasket 40 may have a substantially L-shaped cross-section. The second gasket 40 is configured to maintain the second spacing 44 defined between the nut 36, the lower rim 168 of the bearing housing 32, and the interior wall of the retainer 20.

In various examples, a washer 210 may be positioned between the second leg 202 of the second gasket 40 and the rim surface 178 of the nut 36. The washer 210 may be configured to protect and/or retain the second gasket 40 between the nut 36 and the lower rim 168 of the bearing housing 32.

The bearing housing assembly 10, including the first and second gaskets 38, 40, is configured to reduce noise when the blender jar assembly 12 is operated with the previously discussed blender base. The first and second gaskets 38, 40 are configured to be compressed between the retainer 20 and the bearing housing 32 to reduce wear and vibration noise the blender jar assembly 12 is in use. The gaskets 38, 40 may further be used to prevent contents within the blender jar 14 from leaking into the bearing housing assembly 10.

According to one aspect, a bearing assembly for a blender jar assembly may include a blender jar having a bottom wall that may define an opening. A retainer may be positioned within the blender jar and may define a receiving space in communication with the opening. A jar collar may be positioned exterior of the blender jar and may be operably coupled with the retainer. A bearing housing may be positioned within the receiving space and may be spaced apart from the retainer by a first spacing. A nut may be operably coupled with the bearing housing and may be at least partially received by the receiving space. The nut may be spaced apart from the retainer by a second spacing. A gasket may be positioned to maintain at least one of the first and second spacings of the bearing housing and the nut relative to the retainer.

According to another aspect, an upper edge of a retainer may define an upper aperture, and a lower edge of the retainer may define a lower aperture. The upper aperture may be in communication with an interior cavity of a blender jar.

According to another aspect, a bearing housing may include an upper rim that may be positioned within an upper aperture of a retainer. A nut may be positioned within a lower aperture of the retainer.

According to another aspect, a gasket may be positioned between one of a bearing housing and an upper edge of a retainer, and a nut, an inner wall of the retainer, and the bearing housing.

According to another aspect, a gasket may define a first gasket positioned between a bearing housing and an upper edge of a retainer, and a second gasket may be positioned between a nut, an inner wall of the retainer, and the bearing housing.

According to another aspect, a bearing assembly for a blender jar assembly may include a blender jar defining an interior cavity and a bottom opening. A retainer may be positioned within the interior cavity and may at least partially extend through the bottom opening. The retainer may define a receiving space in communication with an upper aperture and a lower aperture. A bearing housing may be positioned within the receiving space. The bearing housing extends at least partially into the upper aperture of the retainer. The bearing housing may be spaced apart from an inner wall of the retainer to define a first spacing therebetween. A nut may be positioned within the lower aperture of the retainer and may be operably coupled with the bearing housing. The nut may be spaced apart from the inner wall of the retainer to define a second spacing therebetween. A first gasket may be positioned to maintain the first spacing of the bearing housing relative to the retainer. A second gasket may be positioned to maintain the second spacing of the nut relative to the retainer and the bearing housing.

According to another aspect, a bearing assembly may include a jar collar operably coupled with a retainer and positioned exterior of a blender jar.

According to another aspect, a retainer may include an outer rim defining a sealing channel.

According to another aspect, a sealing ring may be positioned within a sealing channel and may at least partially contact a bottom wall of a blender jar and a retainer.

According to another aspect, a nut may include an inner portion and an outer portion. The outer portion may contact an inner wall of a retainer, and the inner portion may contact a lower rim of a bearing housing.

According to another aspect, a blade shaft may extend through a nut, a bearing housing, and a retainer and may be coupled with a plurality of blades positioned within an interior cavity of a blender jar.

According to another aspect, a bearing housing may include a seal member and a bearing assembly positioned around a blade shaft.

According to another aspect, a bearing assembly for a blender jar assembly may include a blender jar having a bottom wall and a bottom opening extending therethrough. A retainer may be positioned to contact the bottom wall and may include an inner wall defining a receiving space. The retainer may include an upper edge that defines an upper aperture and a lower edge that defines a lower aperture. Each of the upper and lower apertures may be in communication with the receiving space. A bearing housing may be positioned within the receiving space. The bearing housing may be at least partially received by the upper aperture of the retainer. The bearing housing may be spaced apart from the upper edge and the inner wall of the retainer. A nut may be positioned within the lower aperture of the retainer and may contact the bearing housing. The nut may be spaced apart from the inner wall of the retainer. A first gasket may be positioned between the bearing housing and the retainer. A second gasket may be positioned between the nut, the retainer, and the bearing housing.

According to another aspect, a first gasket may include a first leg positioned between an upper edge of a retainer and a bearing housing, and a second leg may be positioned between the bearing housing and an inner wall of the retainer.

According to another aspect, a first gasket may include a central portion, and a first leg may extend from a first end of the central portion, and a second leg may extend from a second end of the central portion.

According to another aspect, a second gasket may include a first leg positioned between a lower rim of the bearing housing and an inner wall of a retainer, and a second leg may be positioned between a lower edge of the retainer and a nut.

According to another aspect, one of a first gasket and a second gasket may have an L-shaped cross-section.

According to another aspect, a nut may include an inner portion and an outer portion. The outer portion of the nut contacts an inner wall of a retainer, and the inner portion of the nut contacts a lower rim of a bearing housing.

According to another aspect, a bearing assembly may include a jar collar positioned exterior of a bottom wall of a blender jar. The jar collar may be operably coupled with a retainer by one or more fasteners.

According to another aspect, a nut is at least partially retained by a jar collar.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A bearing assembly for a blender jar assembly, comprising:
   a blender jar having an interior cavity and a bottom wall, wherein the bottom wall includes an opening disposed therethrough;
   a retainer positioned within the interior cavity of the blender jar and extending from an upper edge that defines an upper aperture in communication with the interior cavity to a lower edge that defines a lower aperture and including an inner wall between the upper edge and the lower edge defining a receiving space in communication with the opening;
   a jar collar positioned exterior of the blender jar and operably coupled with the retainer;
   a bearing housing includes a body portion and an upper rim having a smaller diameter than the body portion positioned within the upper aperture of the retainer, the bearing housing positioned within the receiving space and spaced apart from the retainer by a first spacing;
   a nut operably coupled with the bearing housing and at least partially received by the receiving space within the lower aperture of the retainer, wherein the nut is spaced apart from the retainer by a second spacing; and
   a gasket positioned to maintain at least one of the first and second spacings of the bearing housing and the nut relative to the retainer, respectively.

2. The bearing assembly of claim 1, wherein the gasket defines a first gasket that is positioned between the upper rim and the upper edge of the retainer.

3. The bearing assembly of claim 1, wherein the gasket further defines a second gasket positioned between and in contact with a top surface of the nut, an inner wall of the retainer, and the bearing housing.

4. A bearing assembly for a blender jar assembly, comprising:
- a blender jar defining an interior cavity and a bottom opening;
- a retainer positioned within the interior cavity and at least partially extending through the bottom opening, wherein the retainer defines an upper aperture with a first diameter and a lower aperture with a second diameter that is greater than the first diameter, a receiving space is located between the upper aperture and the lower aperture;
- a bearing housing includes a body portion and an upper rim having a smaller diameter than the body portion at least partially positioned within the upper aperture of the receiving space, wherein the bearing housing extends at least partially into the upper aperture of the retainer, and wherein the bearing housing is spaced apart from an inner wall of the retainer to define a first spacing therebetween;
- a nut positioned within the lower aperture of the retainer and operably coupled with the bearing housing, wherein the nut is spaced apart from the inner wall of the retainer to define a second spacing therebetween;
- a first gasket positioned to maintain the first spacing of the bearing housing relative to the retainer; and
- a second gasket positioned to maintain the second spacing of the nut relative to the retainer and the bearing housing.

5. The bearing assembly of claim 4, further comprising:
- a jar collar operably coupled with the retainer and positioned exterior of the blender jar.

6. The bearing assembly of claim 4, wherein the retainer includes an outer rim defining a sealing channel.

7. The bearing assembly of claim 6, wherein a sealing ring is positioned within the sealing channel and at least partially contacts a bottom wall of the blender jar and the retainer.

8. The bearing assembly of claim 4, wherein the nut includes an inner portion and an outer portion extending radially outwardly from the inner portion, and wherein the outer portion contacts the inner wall of the retainer and the inner portion contacts a lower rim of the bearing housing.

9. The bearing assembly of claim 8, wherein a blade shaft extends through the nut, the bearing housing, and the retainer and is coupled with a plurality of blades positioned within the interior cavity of the blender jar.

10. A bearing assembly for a blender jar assembly, comprising:
- a blender jar having an interior cavity, wherein the blender jar further includes a bottom wall and a bottom opening extending through the bottom wall;
- a retainer positioned within the interior cavity and supported by the bottom wall, wherein the retainer includes an inner wall defining a receiving space, wherein the retainer further includes an upper edge that defines an upper aperture and a lower edge that defines a lower aperture, and further wherein the upper and lower apertures are in communication with the receiving space;
- a bearing housing positioned within the receiving space, the bearing housing including a body portion and an upper rim having a smaller diameter than the body portion, wherein the upper rim is at least partially received by the upper aperture of the retainer, and wherein the bearing housing is spaced apart from the upper edge and the inner wall of the retainer;
- a nut positioned within the lower aperture of the retainer and contacting the bearing housing, wherein the nut is spaced apart from the inner wall of the retainer;
- a first gasket positioned between the bearing housing and the retainer; and
- a second gasket positioned between the nut, the retainer, and the bearing housing.

11. The bearing assembly of claim 10, wherein the first gasket includes a first leg positioned between the upper edge and the upper rim and a second leg positioned between the body portion and the inner wall.

12. The bearing assembly of claim 11, wherein the first gasket includes a central portion and the first leg extends from a first end of the central portion and the second leg extends from a second end of the central portion.

13. The bearing assembly of claim 10, wherein the second gasket includes a first leg positioned between a lower rim of the bearing housing and the body portion and a second leg positioned between the lower edge and a top surface of the nut.

14. The bearing assembly of claim 10, wherein one of the first gasket and the second gasket has an L-shaped cross-section.

15. The bearing assembly of claim 10, wherein the nut includes an inner portion and an outer portion extending radially outwardly from the inner portion, and further wherein the outer portion of the nut contacts the inner wall of the retainer and the inner portion of the nut contacts a lower rim of the bearing housing.

16. The bearing assembly of claim 10, further comprising:
- a jar collar positioned exterior of the bottom wall of the blender jar, wherein the jar collar is operably coupled with the retainer by one or more fasteners.

17. The bearing assembly of claim 16, wherein the nut is at least partially retained by the jar collar.

* * * * *